(12) United States Patent
Lui et al.

(10) Patent No.: US 7,171,819 B2
(45) Date of Patent: Feb. 6, 2007

(54) INDIRECT REGENERATIVE AIR CYCLE FOR INTEGRATED POWER AND COOLING MACHINES

(75) Inventors: Clarence Lui, Diamond Bar, CA (US); Myron A. Quan, Cerritos, CA (US)

(73) Assignee: Honeywell International, Inc., Morristown, NJ (US)

( * ) Notice: Subject to any disclaimer, the term of this patent is extended or adjusted under 35 U.S.C. 154(b) by 191 days.

(21) Appl. No.: 11/040,742

(22) Filed: Jan. 21, 2005

(65) Prior Publication Data

US 2006/0162371 A1    Jul. 27, 2006

(51) Int. Cl.
*F28B 9/00* (2006.01)

(52) U.S. Cl. .............................. 62/172; 62/402; 454/71; 60/39.183

(58) Field of Classification Search .................. 62/171, 62/172, 401, 402, 407, 411, 86; 165/235; 454/71; 60/39.183, 785
See application file for complete search history.

(56) References Cited

U.S. PATENT DOCUMENTS

| | | | |
|---|---|---|---|
| 3,981,466 A | 9/1976 | Shah | |
| 4,137,705 A | 2/1979 | Anderson et al. | |
| 4,261,416 A * | 4/1981 | Hamamoto | 165/271 |
| 4,419,926 A * | 12/1983 | Cronin et al. | 454/74 |
| 4,494,372 A * | 1/1985 | Cronin | 60/785 |
| 4,684,081 A * | 8/1987 | Cronin | 244/58 |
| 5,299,763 A * | 4/1994 | Bescoby et al. | 244/118.5 |
| 5,343,692 A | 9/1994 | Thompson et al. | |
| 5,442,905 A | 8/1995 | Claeys et al. | |
| 5,490,645 A | 2/1996 | Woodhouse | |
| 5,553,461 A | 9/1996 | Hitzigrath et al. | |
| 5,791,982 A * | 8/1998 | Curry et al. | 454/74 |
| 6,250,097 B1 * | 6/2001 | Lui et al. | 62/402 |
| 6,283,410 B1 | 9/2001 | Thompson | |
| 6,415,595 B1 | 7/2002 | Wilmont, Jr. et al. | |
| 6,544,114 B2 * | 4/2003 | Buchholz | 454/74 |
| 6,615,606 B2 * | 9/2003 | Zywiak | 62/402 |
| 6,735,951 B2 * | 5/2004 | Thompson | 60/774 |
| 6,776,002 B1 * | 8/2004 | Ho | 62/401 |
| 6,796,131 B2 * | 9/2004 | Sampson | 62/87 |
| 6,848,261 B2 * | 2/2005 | Claeys | 62/87 |

FOREIGN PATENT DOCUMENTS

EP    1418123 A2 *    5/2004

* cited by examiner

*Primary Examiner*—Mohammad M. Ali
(74) *Attorney, Agent, or Firm*—Oral Caglar, Esq.

(57) ABSTRACT

An integrated power and cooling machine having an indirect regenerative air cooling feature may be useful for providing power and environmental control to both ground vehicles, such as tanks, and aircraft, such as helicopters and airplanes. The integrated power and cooling machine may prevent contamination of the conditioned supply air by isolating the conditioned supply air from the machine lubricating and heat transport fluid (e.g., operating fluid) that may leak into the conditioned supply air. Furthermore, the integrated power and cooling machine may utilize a lower energy source from the engine, thereby reducing energy consumption and improving system efficiency. In addition, a flow mixing device may enhance airflow to improve cooling performance.

38 Claims, 2 Drawing Sheets

INDIRECT REGENERATIVE AIR CYCLE FOR INTEGRATED POWER AND COOLING MACHINES

BACKGROUND OF THE INVENTION

The present invention generally relates to an integrated power and cooling machine and, more specifically, to an integrated power and cooling machine having indirect regenerative air cooling wherein the conditioned supply source may be isolated from the machine lubricating and heat transport fluid.

Prior art integrated power and cooling machines have at least two major design deficiencies. First, in using conventional machines, there may be leakage of operating fluid, lube oil and poly-alpha-olefin (PAO) coolant into the supply air, allowing these health-hazardous contaminants to migrate to, for example, passengers on an aircraft. Second, the operation of conventional integrated power and cooling machines requires excessive energy, such as excessive bleed air usage from the engine, which may penalize aircraft range and performance.

U.S. Pat. No. 5,442,905 to Claeys et al. discloses a closed loop thermodynamic cycle for a thermal and power management machine which is powered by preconditioned bleed air expanding in a turbine. The energy extracted from the air expansion in the power turbine is used to power the closed loop which comprises a compressor and another turbine. The closed loop serves as the main cooling source for the heat load of a compartment. The expanded bleed air at low temperature is then used to provide a fresh air source and supplemental cooling for compartment. The use of bleed air penalizes the engine performance and in turn causes a reduction in aircraft range.

U.S. Pat. No. 5,490,645 to Woodhouse discloses a fully integrated environmental and secondary power system that the system operates in combustion mode full time to raise the ambient air pressure to meet the cooling and pressurization demand of a pressurized compartment. The machine can also provide power to start aircraft main engine through a start/generator. Although the Woodhouse concept eliminates the demand of engine bleed air, the direct contact of the supply air flow path with the working fluid of the machine poses an undesirable health-hazardous contamination to a human occupied compartment.

U.S. Pat. No. 6,283,410 to Thompson describes a secondary power integrated cabin energy system for a pressurized aircraft. The system of Thompson couples an auxiliary power unit (APU) and an environmental control system (ECS) to produce cooling and power for aircraft usage. Cabin exhaust air is the main air source for combustion to produce power to operate the entire machine. Cabin air flow is supplied by the load compressor of the APU and fed to the ECS for final air conditioning. Similar to Woodhouse, the Thompson system eliminates bleed air demand from the aircraft, but fails to address the potential contamination of supply air.

As can be seen, there is a need for an improved integrated power and cooling machine having an indirect regenerative air cycle with low penalty bleed air source. Furthermore, there is a need for an improved method for supplying a conditioned supply air to an aircraft that is free of contaminants that may result from leakage of operating fluid.

SUMMARY OF THE INVENTION

In one aspect of the present invention, an integrated power and cooling machine comprises a first compressor for receiving a preconditioned air source, the first compressor for providing a compressed air supply; a regenerative heat exchanger for receiving the compressed air supply; a cooling turbine for receiving the compressed air supply from the regenerative heat exchanger to provide a cooling air supply; a supply source heat exchanger for receiving the cooling air supply; and a first supply source preconditioning heat exchanger for receiving the cooling air supply after passing through the supply source heat exchanger; the regenerative heat exchanger for receiving the cooling air supply after passing through the first supply source heat exchanger; wherein the first supply source preconditioning heat exchanger is adapted for passing a fresh air supply therethrough to provide a preconditioned supply air; and the preconditioned supply air passes through the supply source heat exchanger to provide a conditioned supply air.

In another aspect of the present invention, an integrated power and cooling machine having an indirect regenerative air cycle comprises a first compressor for receiving a conditioned air source, the first compressor for providing a compressed air supply; a regenerative heat exchanger for receiving the compressed air supply; a cooling turbine receiving the compressed air supply from the regenerative heat exchanger to provide a cooling air supply; a supply source heat exchanger receiving the cooling air supply; a load cooling heat exchanger receiving the cooling air supply after passing through the supply source heat exchanger; a first supply source preconditioning heat exchanger receiving the cooling air supply after passing through the load cooling heat exchanger; a second supply source preconditioning heat exchanger receiving the cooling air supply after passing through the regenerative heat exchanger; the regenerative heat exchanger receiving the cooling air supply after passing through the first supply source heat exchanger; the first supply source preconditioning heat exchanger and the second supply source preconditioning heat exchanger adapted for passing a fresh air supply therethrough to provide a preconditioned supply air; and the preconditioned supply air passes through the supply source heat exchanger to provide a conditioned supply air.

In yet another aspect of the present invention, an integrated power and cooling machine having an indirect regenerative air cycle comprises a first compressor for receiving a conditioned air source, the first compressor for providing a compressed air supply; a first liquid-air heat exchanger for extracting heat from the conditioned air source before the conditioned air source is fed to the compressor, wherein the heat extracted by the first liquid-air heat exchanger is rejected to fuel pumped through the first liquid-air heat exchanger via a transportation loop; a regenerative heat exchanger receiving the compressed air supply; a second liquid-air heat exchanger for extracting heat from the compressed air supply before the compressed air supply is fed to the regenerative heat exchanger, wherein the heat extracted by the second liquid-air heat exchanger is rejected to fuel pumped through the second liquid-air heat exchanger via a transportation loop; a cooling turbine receiving the compressed air supply from the regenerative heat exchanger to provide a cooling air supply; a combustor; a power turbine driven by the combustor, the power turbine further driving the first compressor and cooling turbine; a supply source heat exchanger receiving the cooling air supply; a load cooling heat exchanger receiving the cooling air supply after passing through the supply source heat exchanger; a first supply source preconditioning heat exchanger receiving the cooling air supply after passing through the load cooling heat exchanger; a second supply source preconditioning heat exchanger receiving the cooling air supply after passing through the regenerative heat exchanger; the regenerative heat exchanger receiving the cooling air supply after passing through the first supply source heat exchanger; and the first supply source preconditioning heat exchanger and the second supply source preconditioning heat exchanger adapted for passing a fresh air supply therethrough to provide a preconditioned supply air; and the preconditioned supply air passes through the supply source heat exchanger to provide a conditioned supply air.

In a further aspect of the present invention, an aircraft comprises an aircraft cabin for receiving conditioned supply air; and an integrated power and cooling machine for providing the conditioned supply air to the aircraft cabin, wherein the integrated power and cooling machine comprises a first compressor for receiving a conditioned air source, the first compressor for providing a compressed air supply; a regenerative heat exchanger for receiving the compressed air supply; a cooling turbine receiving the compressed air supply from the regenerative heat exchanger to provide a cooling air supply; a supply source heat exchanger receiving the cooling air supply; a load cooling heat exchanger receiving the cooling air supply after passing through the supply source heat exchanger; a first supply source preconditioning heat exchanger receiving the cooling air supply after passing through the load cooling heat exchanger; a second supply source preconditioning heat exchanger receiving the cooling air supply after passing through the regenerative heat exchanger; the regenerative heat exchanger receiving the cooling air supply after passing through the first supply source heat exchanger; and the first supply source preconditioning heat exchanger and the second supply source preconditioning heat exchanger adapted for passing a fresh air supply therethrough to provide a preconditioned supply air; and the preconditioned supply air passes through the supply source heat exchanger to provide a conditioned supply air.

In still a further aspect of the present invention, a method for supplying a conditioned supply air to a vehicle comprises feeding a compressor with a conditioned air source to provide a compressed air supply; passing the compressed air supply through a regenerative heat exchanger; expanding the compressed air supply through a cooling turbine to provide a cooling air supply; passing the cooling air supply through a supply source heat exchanger; passing the cooling air supply through a first supply source preconditioning heat exchanger and through the regenerative heat exchanger; passing a fresh air supply through the first supply source preconditioning heat exchanger to provide a preconditioned supply air; passing the preconditioned supply air through the supply source heat exchanger to provide a conditioned supply air; and delivering the conditioned supply air to a cabin of the vehicle.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Generally, the present invention provides an integrated power and cooling machine having an indirect regenerative air cooling feature. The power and cooling machine of the present invention may be useful in apparatus or vehicles that require both a conditioned air supply and a power supply, such as tanks, helicopters and aircraft.

Unlike conventional power and cooling machines, the present invention may prevent contamination of the conditioned supply air by isolating the conditioned supply air from the machine lubricating and heat transport fluid (e.g., operating fluid) that may leak into the conditioned supply air. Further unlike conventional power and cooling machines, the present invention may utilize less energy from the engine, thereby reducing energy consumption and improving engine performance and system efficiency.

Figure 1:
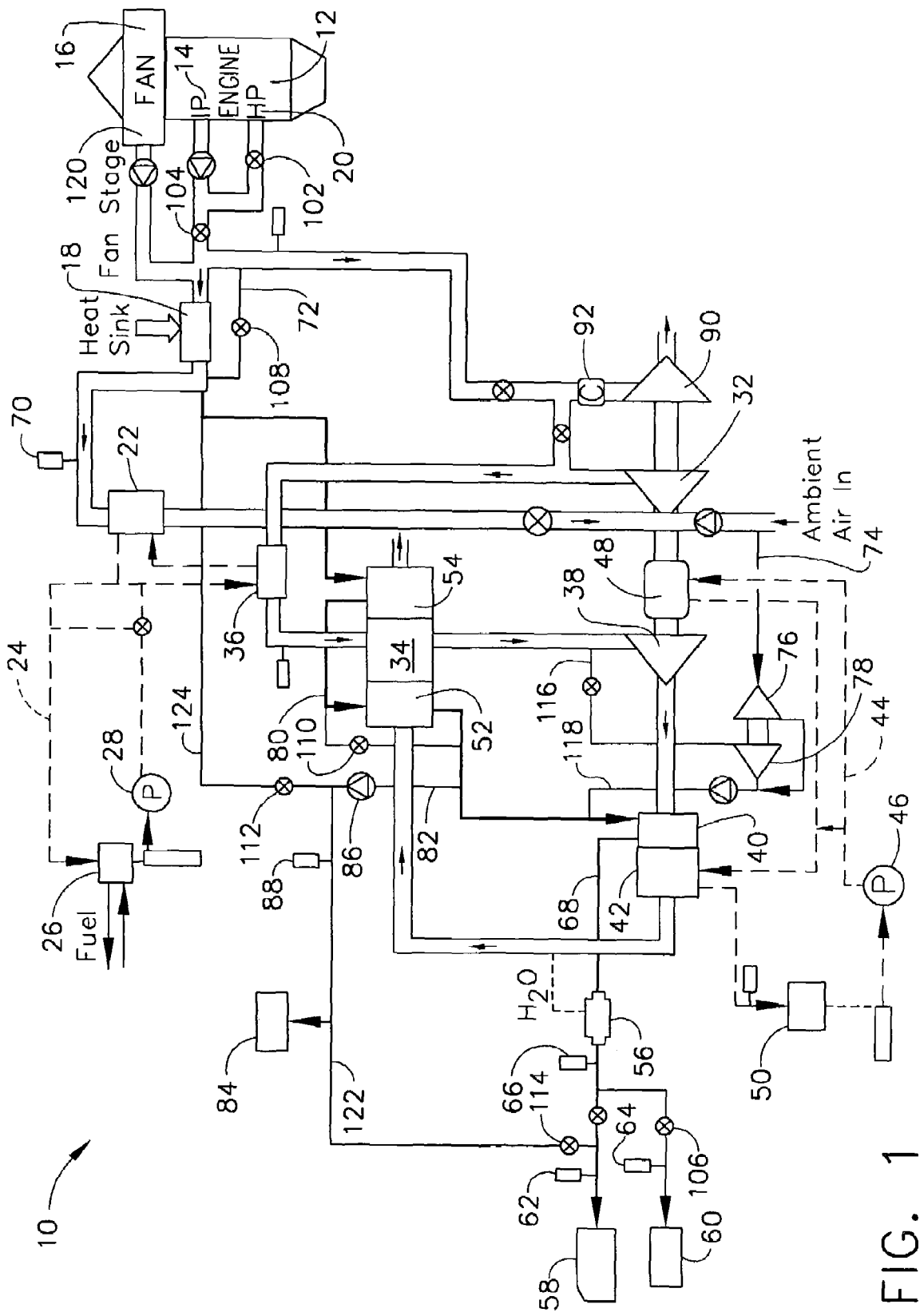
FIG. 1 is a schematic view of an integrated power and cooling machine having an indirect regenerative air cycle according to one embodiment of the present invention.
Figure 2:
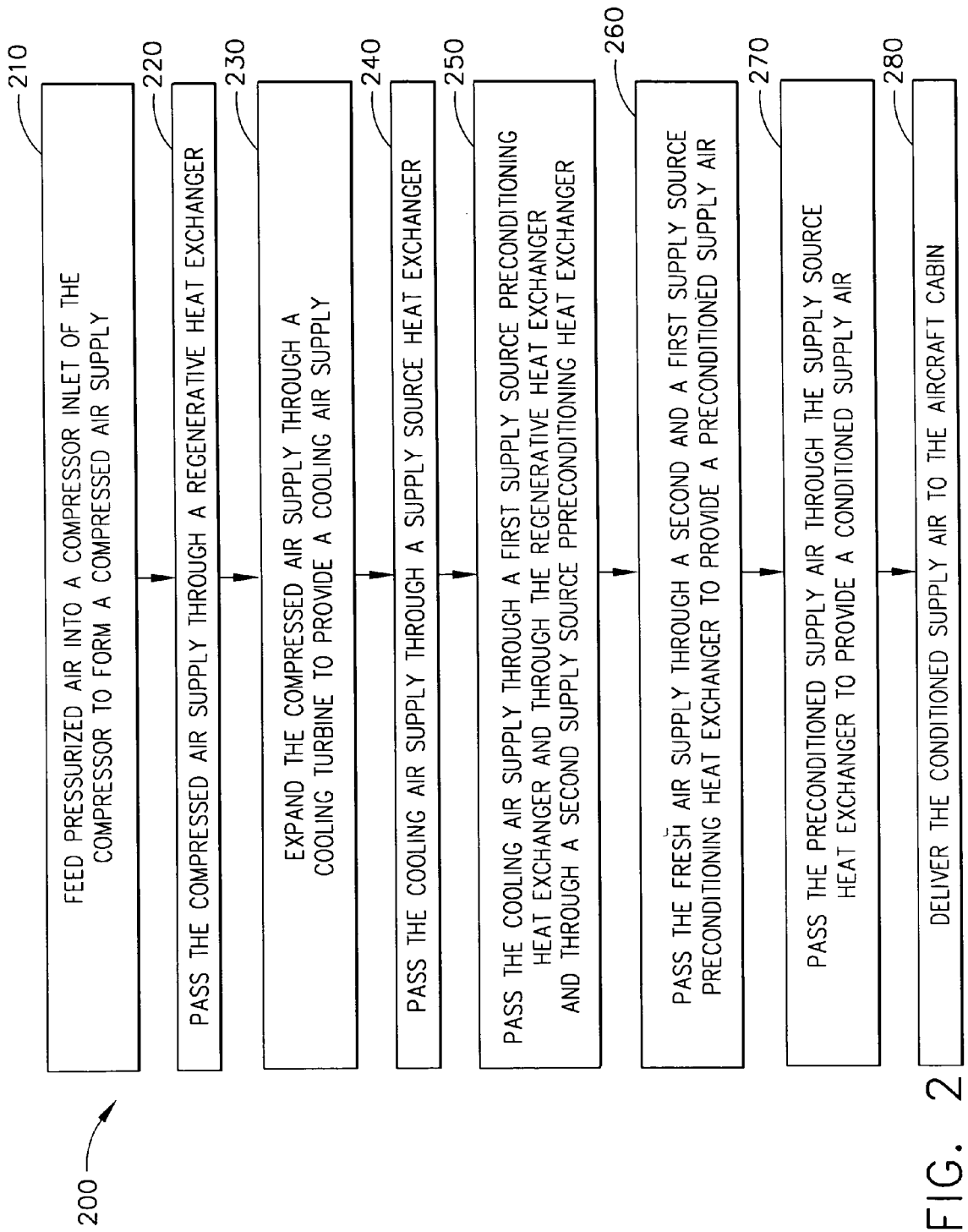
FIG. 2 is a flow chart showing a method of providing a conditioned air supply according to another embodiment of the present invention.

Referring to FIG. 1, there is shown a schematic view of an integrated power and cooling machine 10 according to an embodiment of the present invention. Bleed air from either an intermediate stage of the engine compressor bleed port 14 of an engine 12 or fan air from a fan stage 16 of engine 12 or last stage of engine compressor discharge port 20 from engine 12. The selection of which port may be based on the lowest penalty to engine performance and which may result in optimum aircraft range. This bleed air may be preconditioned to form a conditioned air source by rejecting its heat via heat exchanger 18 to ambient air or engine fan air. The operation of valves 102, 104 may provide a source of bleed air from high-pressure bleed port 20 or engine compressor bleed port 14 or fan port 120 of engine 12.

The temperature of the conditioned air source may be further reduced in a first liquid-air heat exchanger 22 where heat may be rejected to fuel through a transportation loop 24. In transportation loop 24, a cooling fluid, such as PAO, may gain heat by passing through first liquid-air heat exchanger 22. This gained heat may be released to fuel through a liquid-liquid heat exchanger 26. A pump 28 may be provided to circulate the cooling fluid. The resulting conditioned air, after passing through first liquid-air heat exchanger 22, may then be fed to a first compressor 32.

First compressor 32 may compress the preconditioned air from first liquid-air heat exchanger 22 to provide a compressed air supply, wherein the heat of compression is rejected to regenerative air through a regenerative heat exchanger 34 to provide a cooling air supply. Prior to this exchange, the compressed air supply may be preconditioned to reject some of its heat of compression to fuel via second liquid-air heat exchanger 36 in a manner generally as described above in relation to transportation loop 24. Compressor 32 may be driven via a power turbine 90 and cooling turbine 38. Power turbine 90 may be powered by combusting engine bleed air or ambient air in a combustor 92 or expanding pressurized air from engine bleed air from ports 120, 14 or 20.

After passing through regenerative heat exchanger 34, the working fluid air, i.e., the cooling air supply, may then be expanded in a cooling turbine 38 and may be discharged to a supply source heat exchanger 40. After cooling a supply source in supply source heat exchanger 40, the cooling air supply may pass from supply source heat exchanger 40 through a load cooling heat exchanger 42. A load transportation loop 44 may move a cooling fluid, such as PAO, via a pump 46 through a generator 48 and other load sources 50 that may be present, such as electronics and the like.

The cooling air supply, after passing through load cooling heat exchanger 42, may perform regenerative cooling for first and second supply source preconditioning heat exchangers 52 and 54 as well as for regenerative heat exchanger 34. The cooling air supply, after absorbing the heat from heat exchangers 52, 34 and 54, may be discharged overboard.

A fresh air supply (supply air) may be branched from engine bleed air downstream from heat exchanger 18 which may use ambient air or engine fan air as cooling source. Supply air may be further preconditioned in first and second preconditioning heat exchangers 54 and 52. After passing through second preconditioning heat exchanger 52, preconditioned supply air may be further cooled by supply source heat exchanger 40. This results in the supply air being indirectly cooled by discharge air from cooling turbine 38, thereby isolating the supply air from the machine working fluid. In this manner, fluid leakage into the supply air may be prevented.

After passing through supply source heat exchanger 40, the supply air may be dried by a water extractor 56 and delivered to, for example, an aircraft cabin 58 or a load 60 that requires a pure and conditioned air supply.

In the event icing appears in supply source heat exchanger 40, a valve 106 may open to allow a higher flow rate of supply air through supply source heat exchanger 40, thereby maintaining ice-free operations. Unlike conventional cooling system where the icing control usually penalizes system performance, the added air flow for preventing icing in the present invention may be used to provide additional cooling for load 60. Sensors 62, 64, 66 may be located on a supply air path 68 to monitor supply air conditions such as temperature, pressure and flow.

In conventional cooling systems with a single turbine or two turbines in series and prior art power and cooling machine employing closed loop operation, cooling may often be deficient during low power operation of an engine, for example, during ground operation and low power descent of an aircraft (when engine bleed pressure is limited). In the present invention, the cooling turbine 38, which expands the pressurized air to ambient, is the primary force to drive the compressor and that leaves the power turbine 90 with unsaturated capacity. During limited engine pressure operation, additional engine bleed air may be supplied to the power turbine 90 to augment the total power input to the compressor. As a result, greater cooling may be realized during low power operation of engine 12. This technique is also recognized when power is demanded in generator 48 together with full cooling demand from the aircraft. In this mode engine bleed air may expand in both cooling turbine 38 and power turbine 90 to the maximum capacity to simultaneously produce full cooling and power.

Several auxiliary air paths may be incorporated into the integrated power and cooling machine 10. For example, a first auxiliary air path 72 may be equipped with a valve 108 to bypass heat exchanger 18 for temperature control during an extreme low ambient temperature atmosphere. A sensor 70 may be positioned downstream of heat exchanger 18 to determine the flow of air through first auxiliary path 72. A second auxiliary air path 116 may be fed to auxiliary turbine 78. The power from the air expansion in auxiliary turbine 78 may drive an auxiliary compressor 76 to induce ambient air 74. Slightly pressurized ambient air 74 mixes into second auxiliary air path 116 from the auxiliary turbine 78 to form air flow 118. The air flow 118 may be cooled in heat exchanger 40 to enhance cooling performance.

A third auxiliary air path 80 may be used to manage the temperature of supply air path 68 by modulating the flow supplied to heat exchanger 52. A sensor, for example sensor 66, may determine the amount of air flow through third auxiliary air path 80 via adjustment of a valve 110. A fourth auxiliary air path 82 may be used to take conditioned supply air from heat exchanger 52 to a component 84 that requires a warm auxiliary air source, such as an onboard inert gas generator system (OBIGGS) (not shown). A valve 112 may be used to add warm air 124 to form flow 122 at the desired supply temperature for component 84. In a similar approach, valve 114 may be provided warm air 122 to mix with cool supply air at the desired temperature prior to delivery to cabin 58. A check valve 86 may be provided to prevent backflow of warm auxiliary air into supply source heat exchanger 40.

The present invention further provides a method 200 for providing conditioned supply air to, for example, a cabin of an aircraft. The method 200 involves a step 210 of feeding a compressor with a pressurized air from engine or unpressurized ambient air to provide a compressed air supply. In a step 220, the compressed air supply may be passed through a regenerative heat exchanger. In a step 230, the compressed air supply may be expanded by a cooling turbine to provide a cooling air supply. In a step 240, the cooling air supply may be passed through a supply source heat exchanger. In a step 250, the cooling air supply may be passed through the first supply source preconditioning heat exchanger and through the regenerative heat exchanger. In this step 250, the cooling air supply may also be passed through a second supply source preconditioning heat exchanger. In a step 260, a fresh air supply may be passed through the second and the first supply source preconditioning heat exchanger to provide a preconditioned supply air. In a step 270, the preconditioned supply air may be passed through the supply source heat exchanger to provide a conditioned supply air. In step 280, the conditioned supply air may be delivered to, for example, the aircraft cabin.

As can be appreciated from the above description, the present invention may provide isolation between the conditioned supply air and the turbomachine working fluid. Such separation helps prevent contamination of the supply air, thereby resulting in safer operating environments for those relying on the source of supply air. Furthermore, the present invention may provide an integrated regenerative cooling with heat exchangers 52 and 54. Moreover, the present invention may provide an integrated air supply and anti-ice control, thereby forming a favorable icing control scheme that enhances thermal efficiency. The present invention may further use cooling turbine 38 as the primary power source for cooling and use power turbine 90 for power generation and cooling augmentation during periods of low engine power. The present invention may further improve engine efficiency by smart selection of fan stage, low pressure or high pressure engine bleeds to provide the necessary air flow while minimizing engine bleed air energy waste. Finally, an auxiliary cooling turbine/compressor device may be used in the present invention to further enhance cooling performance in the absence of engine bleed air.

It should be understood, of course, that the foregoing relates to exemplary embodiments of the invention and that modifications may be made without departing from the spirit and scope of the invention as set forth in the following claims.

We claim:

1. An integrated power and cooling machine comprising:
   a first compressor for receiving a conditioned air source, the first compressor for providing a compressed air supply;
   a regenerative heat exchanger for receiving the compressed air supply;
   a cooling turbine for receiving the compressed air supply from the regenerative heat exchanger to provide a cooling air supply;
   a supply source heat exchanger for receiving the cooling air supply; and
   a first supply source preconditioning heat exchanger for receiving the cooling air supply after passing through the supply source heat exchanger;
   the regenerative heat exchanger for receiving the cooling air supply after passing through the first supply source preconditioning heat exchanger; wherein:
   the first supply source preconditioning heat exchanger is adapted for passing a fresh air supply therethrough to provide a preconditioned supply air; and
   the preconditioned supply air passes through the supply source heat exchanger to provide a conditioned supply air.

2. The integrated power and cooling machine according to claim 1, wherein the conditioned air source is derived from a smart selection of fan stage, intermediate or last stage of engine compressor from an engine.

3. The integrated power and cooling machine according to claim 2, further comprising:
   a combustor; and
   a power turbine driven by combusted air, the power turbine driving the first compressor.

4. The integrated power and cooling machine according to claim 3, wherein the power turbine is driven by bleed air from the engine.

5. The integrated power and cooling machine according to claim 1, further comprising a second supply source preconditioning heat exchanger for receiving the cooling air supply after passing through the regenerative heat exchanger.

6. The integrated power and cooling machine according to claim 5, wherein the fresh air supply passes through the second supply source preconditioning heat exchanger before passing through the first supply source preconditioning heat exchanger.

7. The integrated power and cooling machine according to claim 1, further comprising a load cooling heat exchanger for receiving the cooling air supply after passing through the supply source heat exchanger.

8. The integrated power and cooling machine according to claim 1, wherein the fresh air supply is preconditioned engine bleed air.

9. The integrated power and cooling machine according to claim 1, further comprising a first liquid-air heat exchanger for extracting heat from the conditioned air source before the conditioned air source is fed to the compressor.

10. The integrated power and cooling machine according to claim 9, wherein the heat extracted by the first liquid-air heat exchanger is rejected to fuel pumped through the first liquid-air heat exchanger via a transportation loop.

11. The integrated power and cooling machine according to claim 1, further comprising a second liquid-air heat exchanger for extracting heat from the compressed air supply before the compressed air supply is fed to the regenerative heat exchanger.

12. The integrated power and cooling machine according to claim 11, wherein the heat extracted by the second liquid-air heat exchanger is rejected to fuel pumped through the second liquid-air heat exchanger via a transportation loop.

13. The integrated power and cooling machine according to claim 2, wherein the conditioned air source is preconditioned with a preconditioning heat exchanger.

14. The integrated power and cooling machine according to claim 3 wherein the cooling turbine is a primary power source for cooling and the power turbine is a primary source for power generation and cooling augmentation.

15. The integrated power and cooling machine according to claim 1, further comprising:
   a second auxiliary air path for passing ambient air to a second compressor;
   an auxiliary cooling turbine expanding pressurized air;
   wherein the mixture of flow from the auxiliary cooling turbine and the second compressor discharge is capable of enhancing cooling of the preconditioned supply air.

16. An integrated power and cooling machine having an indirect regenerative air cycle comprising:
   a first compressor for receiving a conditioned air source, the first compressor for providing a compressed air supply;
   a regenerative heat exchanger for receiving the compressed air supply;
   a cooling turbine receiving the compressed air supply from the regenerative heat exchanger to provide a cooling air supply;
   a supply source heat exchanger receiving the cooling air supply;
   a load cooling heat exchanger receiving the cooling air supply after passing through the supply source heat exchanger;
   a first supply source preconditioning heat exchanger receiving the cooling air supply after passing through the load cooling heat exchanger;
   a second supply source preconditioning heat exchanger receiving the cooling air supply after passing through the regenerative heat exchanger;
   the regenerative heat exchanger receiving the cooling air supply after passing through the first supply source heat exchanger;
   the first supply source preconditioning heat exchanger and the second supply source preconditioning heat exchanger adapted for passing a fresh air supply therethrough to provide a preconditioned supply air; and
   the preconditioned supply air passes through the supply source heat exchanger to provide a conditioned supply air.

17. The integrated power and cooling machine according to claim 16, wherein the conditioned air source is derived from a smart selection of either fan stage, intermediate stage or the last stage of compressor from an engine.

18. The integrated power and cooling machine according to claim 16, wherein the fresh air supply is taken from the conditioned air source.

19. The integrated power and cooling machine according to claim 16, wherein the fresh air supply passes through the second supply source preconditioning heat exchanger before passing through the first supply source preconditioning heat exchanger.

20. The integrated power and cooling machine according to claim 16, further comprising a first liquid-air heat exchanger for extracting heat from the conditioned air source before the conditioned air source is fed to the compressor wherein the heat extracted by the first liquid-air heat exchanger is rejected to fuel pumped through the first liquid-air heat exchanger via a transportation loop.

21. The integrated power and cooling machine according to claim 16, further comprising a second liquid-air heat exchanger for extracting heat from the compressed air supply before the compressed air supply is fed to the regenerative heat exchanger, wherein the heat extracted by the second liquid-air heat exchanger is rejected to fuel pumped through the second liquid-air heat exchanger via a transportation loop.

22. The integrated power and cooling machine according to claim 16, further comprising a first auxiliary air path providing a bypass of the preconditioning heat exchanger.

23. The integrated power and cooling machine according to claim 16, further comprising:
a second auxiliary air path for passing ambient air to a second compressor; and
an auxiliary cooling turbine expanding air from the cooling turbine to extract shaft power to drive the first compressor;
wherein a mixed flow from the auxiliary cooling turbine and the compressor is capable of enhancing cooling of the preconditioned supply air.

24. An integrated power and cooling machine having an indirect regenerative air cycle comprising:
a first compressor for receiving a conditioned air source, the first compressor for providing a compressed air supply;
a first liquid-air heat exchanger for extracting heat from the conditioned air source before the conditioned air source is fed to the compressor, wherein the heat extracted by the first liquid-air heat exchanger is rejected to fuel pumped through the first liquid-air heat exchanger via a transportation loop;
a regenerative heat exchanger receiving the compressed air supply;
a second liquid-air heat exchanger for extracting heat from the compressed air supply before the compressed air supply is fed to the regenerative heat exchanger, wherein the heat extracted by the second liquid-air heat exchanger is rejected to fuel pumped through the second liquid-air heat exchanger via a transportation loop;
a cooling turbine receiving the compressed air supply from the regenerative heat exchanger to provide a cooling air supply;
a combustor;
a power turbine driven by the combustor, the power turbine further driving the first compressor and cooling turbine;
a supply source heat exchanger receiving the cooling air supply;
a load cooling heat exchanger receiving the cooling air supply after passing through the supply source heat exchanger;
a first supply source preconditioning heat exchanger receiving the cooling air supply after passing through the load cooling heat exchanger;
a second supply source preconditioning heat exchanger receiving the cooling air supply after passing through the regenerative heat exchanger;
the regenerative heat exchanger receiving the cooling air supply after passing through the first supply source heat exchanger; and
the first supply source preconditioning heat exchanger and the second supply source preconditioning heat exchanger adapted for passing a fresh air supply therethrough to provide a preconditioned supply air; and
the preconditioned supply air passes through the supply source heat exchanger to provide a conditioned supply air.

25. The integrated power and cooling machine according to claim 24, wherein the conditioned air source is a combination of at least two of fan stage, low pressure and high pressure bleed air from an engine.

26. The integrated power and cooling machine according to claim 25, wherein the power turbine is further driven by bleed air from the engine.

27. An aircraft comprising:
an aircraft cabin for receiving conditioned supply air; and
an integrated power and cooling machine for providing the conditioned supply air to the aircraft cabin, wherein the integrated power and cooling machine comprises:
a first compressor for receiving a conditioned air source, the first compressor for providing a compressed air supply;
a regenerative heat exchanger for receiving the compressed air supply;
a cooling turbine receiving the compressed air supply from the regenerative heat exchanger to provide a cooling air supply;
a supply source heat exchanger receiving the cooling air supply;
a load cooling heat exchanger receiving the cooling air supply after passing through the supply source heat exchanger;
a first supply source preconditioning heat exchanger receiving the cooling air supply after passing through the load cooling heat exchanger;
a second supply source preconditioning heat exchanger receiving the cooling air supply after passing through the regenerative heat exchanger;
the regenerative heat exchanger receiving the cooling air supply after passing through the first supply source heat exchanger; and
the first supply source preconditioning heat exchanger and the second supply source preconditioning heat exchanger adapted for passing a fresh air supply therethrough to provide a preconditioned supply air; and
the preconditioned supply air passes through the supply source heat exchanger to provide a conditioned supply air.

28. The integrated power and cooling machine according to claim 27, further comprising a first liquid-air heat exchanger for extracting heat from the conditioned air source before the conditioned air source is fed to the compressor, wherein the heat extracted by the first liquid-air heat exchanger is rejected to fuel pumped through the first liquid-air heat exchanger via a transportation loop.

29. The integrated power and cooling machine according to claim 27, further comprising a second liquid-air heat exchanger for extracting heat from the compressed air supply before the compressed air supply is fed to the regenerative heat exchanger, wherein the heat extracted by the second liquid-air heat exchanger is rejected to fuel pumped through the second liquid-air heat exchanger via a transportation loop.

30. A method for supplying a conditioned supply air to a vehicle comprising:
   feeding a compressor with a conditioned air source to provide a compressed air supply;
   passing the compressed air supply through a regenerative heat exchanger;
   expanding the compressed air supply through a cooling turbine to provide a cooling air supply;
   passing the cooling air supply through a supply source heat exchanger;
   passing the cooling air supply through a first supply source preconditioning heat exchanger and through the regenerative heat exchanger;
   passing a fresh air supply through the first supply source preconditioning heat exchanger to provide a preconditioned supply air;
   passing the preconditioned supply air through the supply source heat exchanger to provide a conditioned supply air; and
   delivering the conditioned supply air to a cabin of the vehicle.

31. The method according to claim 30, further comprising:
   turning a power turbine with combustion energy from a combustor; and
   driving the first compressor and cooling turbine with the power turbine.

32. The method according to claim 30, further comprising:
   receiving the cooling air supply after passing through the regenerative heat exchanger with a second supply source preconditioning heat exchanger, wherein the fresh air supply passes through the second supply source preconditioning heat exchanger before passing through the first supply source preconditioning heat exchanger.

33. The method according to claim 30, further comprising: after passing the cooling air supply through the supply source heat exchanger, receiving the cooling air supply with a load cooling heat exchanger.

34. The method according to claim 30, further comprising extracting heat from the conditioned air source, before the conditioned air source is fed to the compressor, by using a first liquid-air heat exchanger.

35. The method according to claim 34, further comprising pumping fuel through the first liquid-air heat exchanger, wherein heat is rejected from the conditioned air source to the fuel.

36. The method according to claim 30, further comprising extracting heat from the compressed air supply, before the compressed air supply is fed to the compressor, by using a second liquid-air heat exchanger.

37. The method according to claim 36, further comprising pumping fuel through the second liquid-air heat exchanger, wherein heat is rejected from the compressed air supply to the fuel.

38. The method according to claim 36, further comprising preventing icing in the supply source heat exchanger by increasing the flow of the cooling air supply through the supply source heat exchanger.

* * * * *